(12) United States Patent
Lee et al.

(10) Patent No.: US 9,580,322 B2
(45) Date of Patent: Feb. 28, 2017

(54) METHOD OF PREPARING NEGATIVE ACTIVE MATERIAL FOR RECHARGEABLE LITHIUM BATTERY, AND NEGATIVE ACTIVE MATERIAL AND RECHARGEABLE LITHIUM BATTERY PREPARED FROM THE SAME

(71) Applicant: KNU-Industry Cooperation Foundation, Chuncheon-si (KR)

(72) Inventors: Sung-Man Lee, Chuncheon-si (KR); Yoon-Soo Park, Chuncheon-si (KR)

(73) Assignee: KNU-INDUSTRY COOPERATION FOUNDATION, Chuncheon-si (KR)

( * ) Notice: Subject to any disclaimer, the term of this patent is extended or adjusted under 35 U.S.C. 154(b) by 375 days.

(21) Appl. No.: 13/969,812

(22) Filed: Aug. 19, 2013

(65) Prior Publication Data

US 2014/0065488 A1 Mar. 6, 2014

(30) Foreign Application Priority Data

Aug. 28, 2012 (KR) .................. 10-2012-0094539
Jul. 5, 2013 (KR) .................. 10-2013-0079292

(51) Int. Cl.

| | | |
|---|---|---|
| *H01M 4/133* | (2010.01) | |
| *C01B 31/04* | (2006.01) | |
| *H01M 4/583* | (2010.01) | |
| *H01M 4/04* | (2006.01) | |
| *H01M 4/1393* | (2010.01) | |

(Continued)

(52) U.S. Cl.
CPC ............ *C01B 31/04* (2013.01); *H01M 4/0402* (2013.01); *H01M 4/0471* (2013.01); *H01M 4/133* (2013.01); *H01M 4/1393* (2013.01); *H01M 4/583* (2013.01); *H01M 4/587* (2013.01); *H01M 10/052* (2013.01); *Y02E 60/122* (2013.01); *Y02P 70/54* (2015.11); *Y10T 428/2982* (2015.01)

(58) Field of Classification Search
CPC .......................... H01M 10/0525; H01M 4/133
See application file for complete search history.

(56) References Cited

U.S. PATENT DOCUMENTS

| | | | | |
|---|---|---|---|---|
| 5,554,462 | A | * | 9/1996 | Flandrois ................ C01B 31/04 423/445 R |
| 6,156,432 | A | | 12/2000 | Mabuchi |
| 6,482,547 | B1 | | 11/2002 | Yoon |

(Continued)

FOREIGN PATENT DOCUMENTS

| | | |
|---|---|---|
| CN | 1226224 | 8/1999 |
| CN | 1913200 | 2/2007 |

(Continued)

OTHER PUBLICATIONS

Zhang et al. (Journal of the Electrochemical Society, 148 (12) A1362-A1367 (2001)).*

*Primary Examiner* — Mark F Huff
*Assistant Examiner* — Olatunji Godo
(74) *Attorney, Agent, or Firm* — Lex IP Meister, PLLC

(57) ABSTRACT

Disclosed are a method of preparing a negative active material for a rechargeable lithium battery that includes preparing a solution including spherically shaped natural graphite particles and a solvent, ultrasonic wave-treating the solution, and drying the ultrasonic wave-treated solution to prepare graphite modified particles, and a rechargeable lithium battery prepared therefrom.

14 Claims, 20 Drawing Sheets

(51) Int. Cl.
*H01M 4/587* (2010.01)
*H01M 10/052* (2010.01)

(56) References Cited

U.S. PATENT DOCUMENTS

| | | | |
|---|---|---|---|
| 8,999,581 B2 | 4/2015 | Lee | |
| 2007/0190413 A1 | 8/2007 | Lee | |
| 2010/0143798 A1* | 6/2010 | Zhamu | H01M 4/133 |
| | | | 429/212 |
| 2011/0171532 A1 | 7/2011 | Okanishi | |

FOREIGN PATENT DOCUMENTS

| | | |
|---|---|---|
| CN | 101159323 A * | 4/2008 |
| CN | 101449410 | 6/2009 |
| CN | 102376937 | 3/2012 |
| JP | 2009535776 | 10/2009 |
| JP | 2010-501970 | 1/2010 |
| JP | 2010501970 | 1/2010 |
| JP | 2012084520 | 4/2012 |
| KR | 10-1999-0053899 | 7/1999 |
| KR | 10-2000-0029478 | 5/2000 |
| KR | 10-2004-0096279 | 11/2004 |
| KR | 2005-0057237 | 6/2005 |
| KR | 10-2008-0093242 | 10/2008 |
| KR | 10-2009-0031421 | 3/2009 |
| KR | 10-2009-0052220 | 5/2009 |
| KR | 2011-0133701 | 12/2011 |
| KR | 2012-0057792 | 6/2012 |
| WO | 2007-136164 | 11/2007 |
| WO | 2011-125577 | 10/2011 |

* cited by examiner

METHOD OF PREPARING NEGATIVE ACTIVE MATERIAL FOR RECHARGEABLE LITHIUM BATTERY, AND NEGATIVE ACTIVE MATERIAL AND RECHARGEABLE LITHIUM BATTERY PREPARED FROM THE SAME

RELATED APPLICATIONS

This application claims priority to and the benefit of Korean Patent Application Nos. 10-2012-0094539 and 10-2013-0079292 filed in the Korean Intellectual Property Office on Aug. 28, 2012, and Jul. 5, 2013, the entire contents of which are incorporated herein by reference.

BACKGROUND

1. Field

The present invention provides a method of preparing a negative active material for a rechargeable lithium battery, and a negative active material and a rechargeable lithium battery prepared therefrom.

2. Description of the Related Art

At present, a crystalline graphite material is being used as a negative active material for a rechargeable lithium battery. The crystalline graphite is classified into artificial graphite and natural graphite. Since the artificial graphite is obtained by heat-carbonizing a common carbon precursor at a high temperature of greater than or equal to about 2800° C. under an inert atmosphere through impurity removal and graphitization, the natural graphite has been increasingly used in recent times.

However, a flake-shaped natural graphite particle as a negative active material has a problem of deteriorating uniformity due to anisotropic characteristics of its shape when slurry is coated to manufacture an electrode, and also sharply deteriorates battery characteristics since the particle is arranged along with a current collector by compression and pressure. Accordingly, spherically-shaped natural graphite obtained by assembling flake-shaped graphite into a spherical shape is commercially available. However, the spherically-shaped natural graphite requires improved high-rate charge and discharge and cycle-life characteristics.

SUMMARY

One embodiment provides a method of preparing a negative active material for a rechargeable lithium battery having excellent high-rate charge and discharge characteristics and cycle-life characteristics.

Another embodiment provides a negative active material for a rechargeable lithium battery prepared from the method of preparing the negative active material.

Yet another embodiment provides a rechargeable lithium battery including the negative active material.

One embodiment provides a method of preparing a negative active material for a rechargeable lithium battery that includes preparing a solution including spherically shaped natural graphite particles and a solvent; ultrasonic wave-treating the solution; and drying the ultrasonic wave-treated solution to prepare modified graphite particles.

The spherically shaped natural graphite particles may be prepared by assembling flake-shaped natural graphite particles into a spherical shape.

The spherically shaped natural graphite particles may have an average particle diameter (D50) of about 3 to about 40 μm.

The solvent may include at least one selected from water, N-methylpyrrolidone, dimethylformamide, toluene, ethylene, dimethylacetamide, acetone, methylethylketone, hexane, tetrahydrofuran, decane, ethanol, methanol, isopropanol, and ethyl acetate.

The spherically shaped natural graphite particles may be included in an amount of about 0.1 to about 200 parts by weight based on 100 parts by weight of the solvent.

The ultrasonic waves may be radiated at an intensity of about 50 to about 1200 W for about 0.1 to about 30 minutes with a frequency of about 10 to about 40 Hz.

The drying may be performed using at least one spray dry method selected from rotary spray, nozzle spray, and ultrasonic wave spray methods; a drying method using a rotary evaporator; a vacuum-dry method; or a natural drying method.

The solution may further include a carbon precursor, and in this case, the method may further include heat-treating the graphite modified particles to prepare graphite modified composite particles after preparing the graphite modified particles. The heat-treating may be performed at a temperature of about 500 to about 2500° C., and may be performed under an atmosphere including nitrogen, argon, hydrogen, or a mixed gas thereof, or under vacuum.

The carbon precursor may include at least one selected from citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene-propylene-diene monomer (EPDM), sulfonated EPDM, starch, a phenolic resin, a furan resin, furfuryl alcohol, polyacrylic acid, sodium polyacrylate, polyacrylonitrile, polyimide, an epoxy resin, cellulose, styrene, polyvinyl alcohol, polyvinylchloride, coal-based pitch, petroleum-based pitch, mesophase pitch, low molecular weight heavy oil, glucose, gelatin, and saccharides.

The carbon precursor may be included in an amount of about 0.1 to about 80 parts by weight based on 100 parts by weight of the spherically shaped natural graphite particles.

The solution may further include a lithium compound, and in this case, the method may further include heat-treating the graphite modified particles to prepare graphite modified composite particles. The heat-treating may be performed at a temperature of about 150 to about 2500° C., and may be performed under an atmosphere including nitrogen, argon, hydrogen, air, oxygen, or a mixed gas thereof, or under vacuum.

The lithium compound may include at least one selected from lithium hydroxide including LiOH or LiOH.($H_2O$); lithium nitrate ($LiNO_3$); lithium acetate including $CH_3COO.Li$ or $CH_3COO.Li.2(H_2O)$; lithium carbonate ($Li_2CO_3$); and lithium fluoride (LiF).

The lithium compound may be included in an amount of about 0.1 to about 50 parts by weight based on 100 parts by weight of the spherically shaped natural graphite particles.

The solution may further include a carbon precursor and a lithium compound, and in this case, the method may further include heat-treating the graphite modified particle to prepare graphite modified composite particles after preparing the graphite modified particles. The heat-treating may be performed at a temperature of about 150 to about 2500° C.

Another embodiment provides a negative active material for a rechargeable lithium battery prepared according to the preparation method.

Yet another embodiment provides a rechargeable lithium battery including the negative electrode including the negative active material, a positive electrode, and an electrolyte solution.

Other embodiments are included in the following detailed description.

The negative active material prepared according to the preparation method may realize a rechargeable lithium battery having excellent high-rate charge and discharge characteristics and cycle-life characteristics.

DETAILED DESCRIPTION

Figure 1:
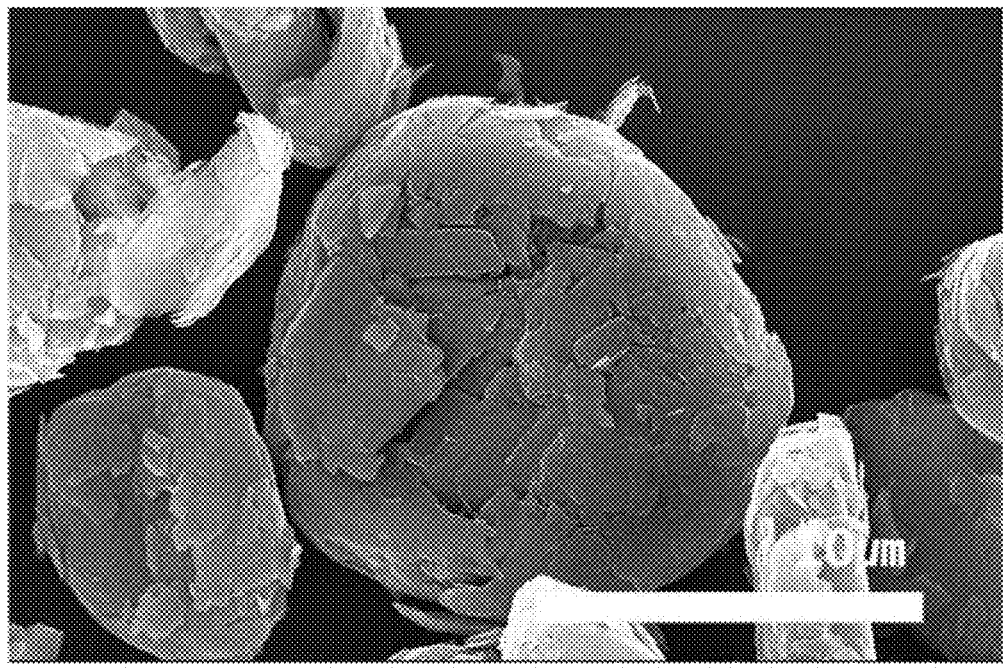
FIGS. 1 to 6 are scanning electron microscope (SEM) photographs of the negative active materials according to Examples 1 to 6, respectively.
Figure 2:
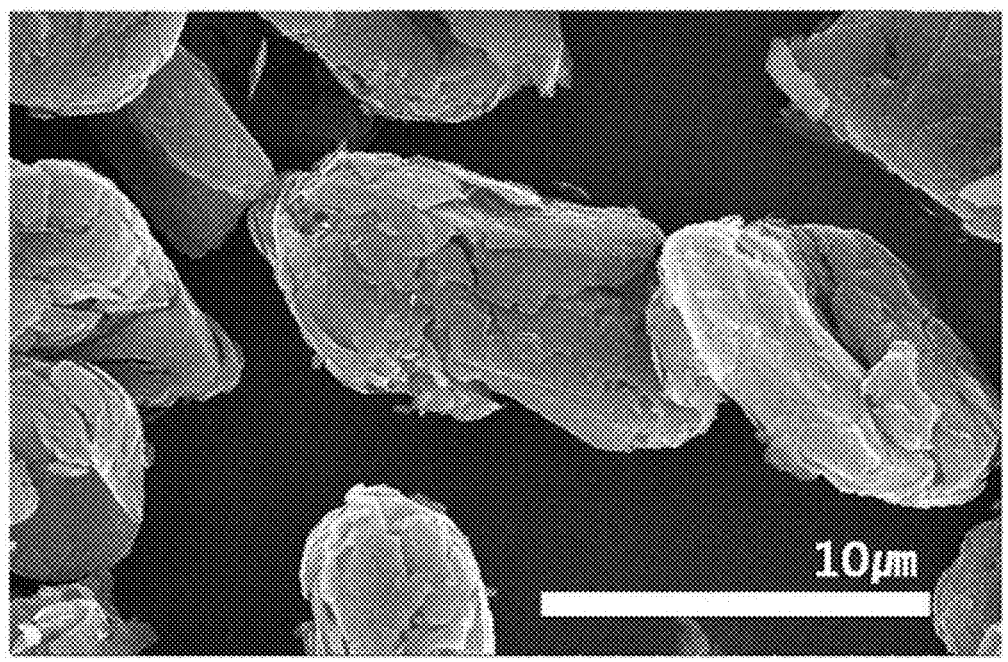
Figure 3:
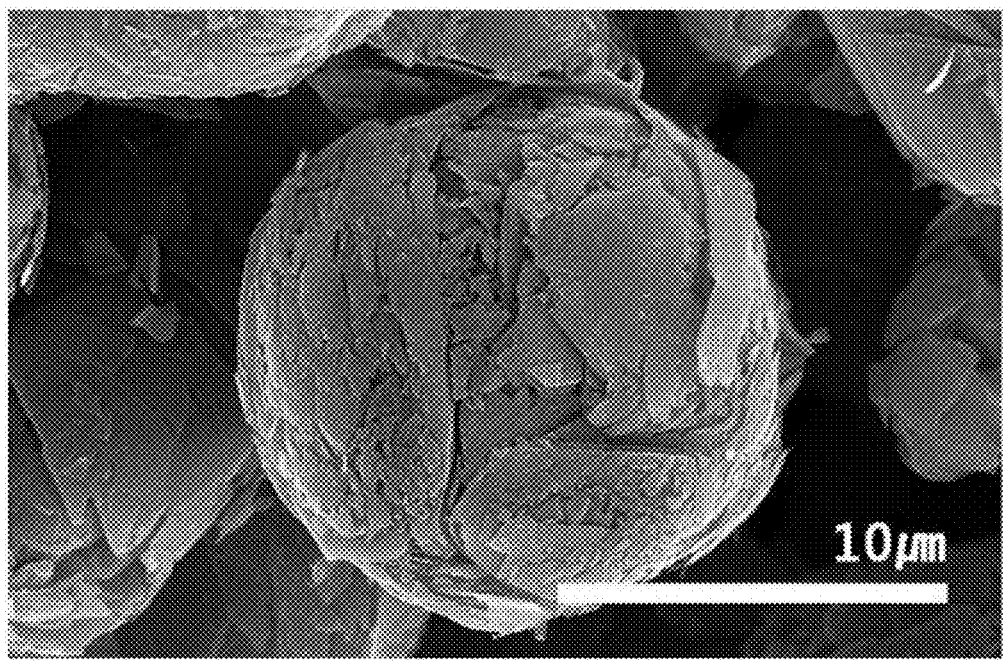
Figure 4:
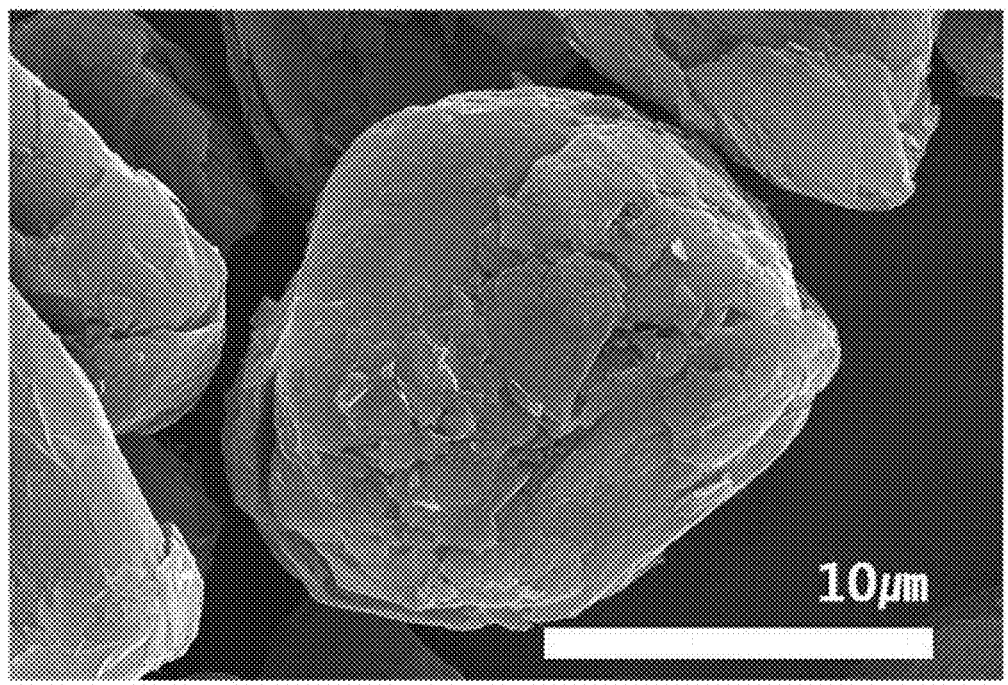
Figure 5:
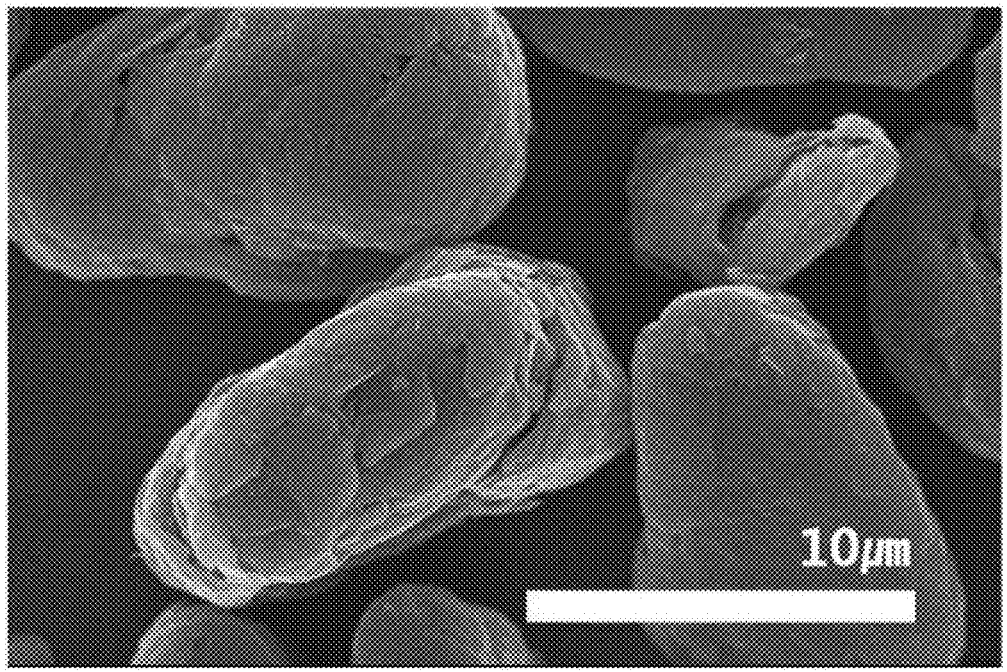
Figure 6:
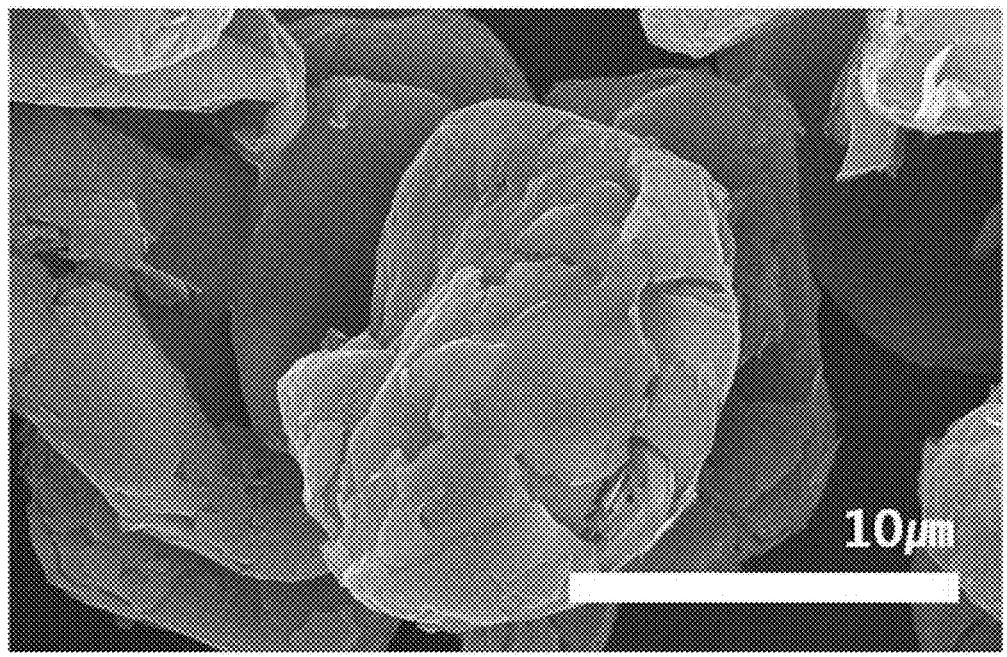

Hereinafter, embodiments are described in detail. However, these embodiments are exemplary, and this disclosure is not limited thereto.

A negative active material according to one embodiment is prepared according to the following method.

A solution including spherically shaped natural graphite particle and a solvent is prepared, the solution is ultrasonic wave-treated, and the ultrasonic wave-treated solution is dried to prepare a graphite modified particle.

The spherically shaped natural graphite particle may be formed according to the methods suggested in Korean Patent Laid-Open Publication Nos. 2003-0087986 and 2005-0009245, without limitation. For example, a flake-shaped natural graphite having an average particle diameter of greater than or equal to about 30 μm is assembled and ultimately manufactured into a spherically-shaped natural graphite particle by pulverization through contact between the inside of the rotary processor and the flake-shaped natural graphite powder, a friction process among powders, a shear process of the powder by a shear stress, and the like by a repetitive process with a rotary processor.

A natural graphite particle like the flake-shaped graphite particle may deteriorate uniformity of a slurry coating due to anisotropy when an electrode is manufactured, and may also deteriorate battery characteristics since the natural graphite particle is arranged along with a current collector. According to one embodiment, the natural graphite particle is spherically shaped to have high isotropy.

The spherically-shaped natural graphite particles may be bulbed up into a cabbage or random shape. In addition, the spherically shaped natural graphite particle may have a circle or oval shape, and specifically, a spherical shape having an index obtained by projecting a three dimensional natural graphite particle on a two dimensional plane of greater than or equal to about 0.8.

The spherically shaped natural graphite particle may have an average particle diameter (D50) ranging from about 3 to about 40 μm, and specifically, about 5 to about 30 μm. When a spherically-shaped natural graphite particle having an average particle diameter within the range is used as a negative active material, high-rate charge and discharge characteristic effects due to ultrasonic wave treatment are increased.

The spherically shaped natural graphite particle may be included in an amount of about 0.1 to about 200 parts by weight, and specifically, about 0.1 to about 100 parts by weight based on 100 parts by weight of the solvent. When the spherically shaped natural graphite particle is included within the range, ultrasonic wave treatment effects in a solution are maximized and micropores and spaces on the surface of and inside the particle are well formed, and in addition, when the solution includes a carbon precursor, impregnation of the particle may be facilitated.

The solvent may include at least one selected from water, N-methylpyrrolidone, dimethylformamide, toluene, ethylene, dimethylacetamide, acetone, methylethylketone, hexane, tetrahydrofuran, decane, ethanol, methanol, isopropanol, and ethyl acetate.

When the solution including the spherically-shaped natural graphite particle is treated with ultrasonic waves to prepare a negative active material, micropores are formed on the surface of and inside the spherically-shaped natural graphite particle. Accordingly, the negative active material has improved reactivity with an electrolyte solution, and may realize a rechargeable lithium battery having excellent high-rate charge and discharge and cycle-life characteristics.

The ultrasonic wave treatment may be performed in an aqueous solution or organic solvent including the spherically-shaped natural graphite particle.

The ultrasonic wave treatment causes three representative physical phenomena of fluid cavitation, local heating, and free radical formation. The fluid cavitation is a phenomenon of delivering a force generated due to bubble production and explosion to a particle for ultrasonic wave treatment. In general, the ultrasonic wave treatment may be a bath type and a horn type. The bath-type ultrasonic wave treatment has a higher frequency than the horn-type ultrasonic wave treatment, and thus may not bring about precisely-defined fluid cavitation but may uniformly deliver its frequency through a liquid medium. The horn-type ultrasonic wave has a relatively short frequency and forms relatively larger bubbles, and thus may deliver a greater amount of energy when the bubbles are puffed off. In this way, when bubbles are repeatedly generated and puffed off the surface of a particle and lead an impact and dispersion to the particle, the ultrasonic wave treatment may form micropores on the surface of and inside the spherically shaped natural graphite particle. The ultrasonic wave treatment may modify the surface and the inside of the spherically shaped natural graphite particle. Accordingly, when the spherically shaped natural graphite particle having micropores on the surface and inside is used as a negative active material, the negative active material has improved reactivity with an electrolyte solution and may realize a rechargeable lithium battery having excellent high-rate charge and discharge characteristics.

The ultrasonic waves may be radiated at an intensity of about 50 to about 1200 W for about 0.1 to about 30 minutes, and specifically at an intensity of about 100 to about 1000 W for about 1 to about 10 minutes. The ultrasonic waves may have a frequency of about 10 to about 40 kHz, and specifically about 15 to about 25 kHz. When the ultrasonic waves are radiated within the condition range, a sufficient force may be delivered and induce sufficient impact and dispersion to the spherically shaped natural graphite particle, and thus form micropores on the surface of and inside the spherically shaped natural graphite particle.

The drying may be performed using at least one spray dry method selected from rotary spray, nozzle spray, and ultrasonic wave spray methods; a drying method using a rotary evaporator; a vacuum drying method; or a natural drying method.

The solution may further include a carbon precursor as well as the spherically shaped natural graphite particle. Herein, the solution including the spherically shaped natural graphite particle, the carbon precursor, and the solvent is treated with ultrasonic waves and dried in the same method as used to manufacture the above-described graphite modified particle, and then the graphite modified particle may be further heat-treated to manufacture a graphite modified composite particle through carbonization of the carbon precursor.

When a spherically shaped natural graphite particle is used as a negative active material to manufacture an electrode, the spherically shaped natural graphite particle may be crushed during compression. However, when the spherically shaped natural graphite particle is treated with ultrasonic waves in the solution including the carbon precursor and the solvent, the carbon precursor is impregnated on the surface of the spherically shaped natural graphite particle and into a space among the spherically shaped natural graphite particles and carbonized in a subsequent heat-treating process, and thus may prevent crushing of a graphite modified composite particle obtained from the carbonization and improve high-rate charge and discharge characteristics of a rechargeable lithium battery.

The carbon precursor may include at least one selected from citric acid, stearic acid, sucrose, polyvinylidene fluoride, carboxylmethyl cellulose (CMC), hydroxypropyl cellulose, regenerated cellulose, polyvinylpyrrolidone, tetrafluoroethylene, polyethylene, polypropylene, ethylene-propylene-diene monomer (EPDM), sulfonated EPDM, starch, a phenolic resin, a furan resin, furfuryl alcohol, polyacrylic acid, sodium polyacrylate, polyacrylonitrile, polyimide, an epoxy resin, cellulose, styrene, polyvinyl alcohol, polyvinylchloride, coal-based pitch, petroleum-based pitch, mesophase pitch, low molecular weight heavy oil, glucose, gelatin, and saccharides, but is not limited thereto.

The ultrasonic wave treatment may be performed in an aqueous solution or an organic solvent in which the carbon precursor is dissolved.

When the graphite modified particle obtained through the ultrasonic wave treatment is heat treated, the carbon precursor is carbonized and forms low crystalline carbon and amorphous carbon, and the carbons are coated on the surface of the spherically shaped natural graphite particle and are present in a space among the spherically shaped graphite particles, obtaining a graphite modified composite particle.

The heat-treating may be performed at a temperature of about 500 to about 2500° C., specifically about 500 to about 2000° C., and more specifically about 900 to about 1500° C. When the heat-treating is performed within the temperature range, impurities such as heteroelements are sufficiently removed during carbonization of the carbon precursor, and thus irreversible capacity of a battery may be decreased, and its charge and discharge characteristics may be improved.

The heat-treating may be performed under an atmosphere including nitrogen, argon, hydrogen, or a mixed gas thereof, or under vacuum.

The carbon precursor may be included in an amount of about 0.1 to about 80 parts by weight, and specifically about 0.5 to about 50 parts by weight, based on 100 parts by weight of the spherically shaped natural graphite particle. When the carbon precursor is included within the range, micorpores may be appropriately distributed and maintained on the surface of and inside the spherically shaped natural graphite particle.

The solution may further include a lithium compound other than the spherically shaped natural graphite particle. Herein, the solution including the spherically shaped natural graphite particle, the carbon precursor, and the solvent is treated with ultrasonic waves and dried in the same method as used to manufacture the above-described graphite modified particle, and then the graphite modified particle may be further heat-treated to manufacture a graphite modified composite particle through carbonization of the carbon precursor.

When the lithium compound is included, irreversible reaction of the spherically shaped natural graphite particle may be decreased, and high-rate charge and discharge characteristics of a rechargeable lithium battery may be improved.

The lithium compound may include at least one selected from lithium hydroxide including LiOH or $LiOH.(H_2O)$; lithium nitrate ($LiNO_3$); lithium acetate including $CH_3COO.Li$ or $CH_3COO.Li.2(H_2O)$; lithium carbonate ($Li_2CO_3$); and lithium fluoride (LiF), but is not limited thereto.

The ultrasonic wave treatment may be performed in an aqueous solution or organic solvent in which the lithium compound is dissolved.

When the graphite modified particle obtained through the ultrasonic wave treatment is heat-treated as aforementioned, the lithium compound is decomposed and forms lithium oxide ($Li_2O$), lithium fluoride (LiF), and lithium carbonate ($Li_2CO_3$), and external and internal surfaces of the spherically shaped natural graphite particle are further modified into a graphite modified composite particle.

The heat-treating may be performed at a temperature of about 150 to about 2500° C., and specifically about 200 to about 1500° C. When the heat-treating is performed within the temperature range, the lithium compound may be sufficiently decomposed, and the surface of the spherically shaped natural graphite particle is further modified, decreasing irreversible capacity and improving charge and discharge characteristics.

The heat-treating may be performed under an atmosphere including nitrogen, argon, hydrogen, air, oxygen, or a mixed gas thereof, or under vacuum.

The lithium compound may be included in an amount of about 0.1 to about 50 parts by weight, and specifically about 0.3 to about 30 parts by weight, based on 100 parts by weight of the spherically shaped natural graphite particle. When the lithium compound is included within the range, the lithium compound is impregnated and distributed among micorpores of the spherically shaped natural graphite particles, and thus charge and discharge characteristics such as initial charge and discharge efficiency and the like may be improved.

The solution may further include the carbon precursor and the lithium compound other than the spherically shaped natural graphite particle. Herein, the solution including the spherically shaped natural graphite particle, the carbon precursor, and the solvent is treated with ultrasonic waves and dried in the same method as used to manufacture the above-described graphite modified particle, and then the graphite modified particle may be further heat-treated to manufacture a graphite modified composite particle through carbonization of the carbon precursor.

Herein, kinds and contents of the carbon precursor and the lithium compound are the same as described above.

Herein, the heat-treating may be performed at a temperature of about 150 to about 2500° C., and may be performed under an atmosphere including nitrogen, argon, hydrogen, or a mixed gas thereof, or under vacuum.

According to another embodiment, a negative active material prepared according to the preparing method described above is provided.

The negative active material may include a surface-modified spherically shaped natural graphite particle. The negative active material may include the graphite modified composite particle coated with low crystalline carbon and amorphous carbon on the surface of the spherically shaped natural graphite particle and the internal surface of the spherically shaped natural graphite particle. The negative active material may include the graphite modified composite particle coated with low crystalline carbon and amorphous carbon including a lithium compound on the surface of the spherically shaped natural graphite particle and the internal surface of the spherically shaped natural graphite particle.

According to yet another embodiment, a rechargeable lithium battery including the negative electrode including the negative active material, a positive electrode, and an electrolyte solution is provided.

Rechargeable lithium batteries may be classified as lithium ion batteries, lithium ion polymer batteries, and lithium polymer batteries according to the presence of a separator and the kind of electrolyte used in the battery. The rechargeable lithium batteries may also be classified as cylindrical, prismatic, coin-type, or pouch-type batteries according to shapes, and may be classified as thin film or bulk batteries. Structures and preparation methods for lithium ion batteries pertaining to this disclosure are well known in the art.

The negative electrode may be manufactured by mixing the above-described negative active material, a binder, and optionally a conductive material to prepare a composition for a negative active material layer, and applying the composition on a negative current collector.

The binder may include polyvinyl alcohol, a carboxylmethyl cellulose/styrene-butadiene rubber, hydroxypropylene cellulose, diacetylenecellulose, polyvinylchloride, polyvinylpyrrolidone, polytetrafluoroethylene, polyvinylidene fluoride, polyethylene, or polypropylene, but is not limited thereto.

The binder may be mixed in an amount of about 1 to about 30 wt % based on the total amount of the composition for a negative active material layer.

The conductive material may be any one having conductivity while not causing chemical changes in a battery without particular limitation. Specifically the conductive material may include natural graphite, artificial graphite, and the like graphite; carbon black such as acetylene black, ketjen black, channel black, furnace black, lamp black, thermal black, and the like; a conductive fiber such as a carbon fiber, a metal fiber, and the like; carbon fluoride; a metal powder such as aluminum, nickel powder, and the like; a conductive whisker such as zinc oxide, potassium titanate, and the like; a conductive metal oxide such as titanium oxide and the like; and a conductive material such as a polyphenylene derivative and the like.

The conductive material may be included in an amount of about 0.1 to about 30 wt % based on the total amount of the composition for a negative active material layer.

The negative current collector may have a thickness of about 3 to about 500 μm. Examples of the negative current collector may be stainless steel, aluminum, nickel, titanium, fired carbon, or aluminum or stainless steel that is surface-treated with carbon, nickel, titanium, silver, and the like. The negative current collector may have fine protrusions and depressions on the surface thereof in order to improve adherence of the negative active material, and may have various shapes such as a film, a sheet, a foil, a net, a porous structure, a foam, and a non-woven fabric structure.

The positive electrode includes a positive active material, and the positive active material may include lithiated intercalation compounds that reversibly intercalate and deintercalate lithium ions. Specifically, the positive active material may include a composite oxide including at least one selected from cobalt, manganese, and nickel, and lithium.

The positive electrode may be manufactured by mixing the positive active material, a binder, and optionally a conductive material to prepare a composition for a positive active material layer, and applying the composition on a positive current collector such as aluminum and the like, according to the same method as the negative electrode.

The electrolyte solution includes a lithium salt; and a non-aqueous organic solvent, an organic solid electrolyte, or an inorganic solid electrolyte.

The lithium salt includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborane, lithium lower aliphatic carbonate, lithium 4 phenyl borate, an imide, and the like.

The non-aqueous organic solvent may include N-methyl-2-pyrrolidone, propylene carbonate, ethylene carbonate, butylene carbonate, dimethyl carbonate, diethyl carbonate, gamma-butyro lactone, 1,2-dimethoxyethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, a phosphate triester, trimethoxy methane, a dioxolane derivative, sulfolane, methyl sulfolane, 1,3-dimethyl-2-imidazolidone, a propylene carbonate derivative, a tetrahydrofuran derivative, ether, methyl pyropionate, ethyl propionate, and the like.

The organic solid electrolyte may include a polyethylene derivative, a polyethylene oxide derivative, a polypropylene oxide derivative, a phosphoric acid ester, a polymer, poly agitation lysine, polyester sulfide, polyvinyl alcohol, polyvinylidene fluoride, a polymer including an ionic leaving group, and the like.

The inorganic solid electrolyte may include Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$, and the like, or a Li nitride, a Li halide, a Li sulfate, and the like.

The electrolyte solution may further include, for example, pyridine, triethylphosphite, triethanolamine, cyclic ether, ethylene diamine, n-glyme, hexa phosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, and the like, in order to improve charge and discharge characteristics, flame retardancy, and the like.

In order to improve inflammability, the electrolyte solution may further include a halogen-containing solvent such as carbon tetrachloride, ethylene trifluoride, and the like, and in order to improve storage characteristics at a high temperature, the electrolyte solution may further include a carbon dioxide gas.

A separator may be present between the positive electrode and the negative electrode according to kinds of the rechargeable lithium battery. Such a separator may be an insulating thin film having high ion transmittance and mechanical strength. The separator may have a pore diameter of about 0.01 to about 10 μm, and a thickness of about 5 to about 300 μm.

The separator may be specifically a sheet or non-woven fabric made of a chemical resistant and hydrophobic olefin-based polymer polypropylene and the like; a glass fiber; polyethylene; and the like. When the electrolyte solution is a solid electrolyte such as a polymer and the like, the solid electrolyte may act as a separator.

Hereinafter, the following examples illustrate the present invention in more detail. However, the following examples are exemplary and the present invention is not limited to the examples.

(Preparation of Negative Active Material)

Example 1

Graphite modified particles were manufactured by adding 1 part by weight of spherically-shaped natural graphite particles having an average particle diameter (D50) of 11 μm (SGB10L, Carbonix Inc.) to 100 parts by weight of a solvent prepared by mixing distilled water and acetone in a weight ratio of 6:4, agitating the mixture with a magnetic agitator and simultaneously ultrasonic wave-treating the mixture with a frequency of 20 kHz and strength of 375 W for 5 minutes, and then naturally drying the product at 80° C.

Example 2

Graphite modified particles were manufactured by adding 1 part by weight of spherically-shaped natural graphite particles having an average particle diameter (D50) of 11 μm (SGB10L, Carbonix Inc.) to 100 parts by weight of a solvent prepared by mixing distilled water and acetone in a weight ratio of 6:4, agitating the mixture with a magnetic agitator and simultaneously ultrasonic wave-treating the mixture with a frequency of 20 kHz and strength of 375 W for 10 minutes, and then naturally drying the product at 80° C.

Example 3

A solution including 0.025 parts by weight of lithium acetate based on 100 parts by weight of distilled water was prepared. 1 part by weight of spherically-shaped natural graphite particles having an average particle diameter (D50) of 11 μm (SGB10L, Carbonix Inc.) was added to the solution, the mixture was agitated and simultaneously ultrasonic wave-treated with a frequency of 20 kHz and strength of 375 W for 10 minutes, and then naturally dried at 100° C., manufacturing a graphite modified particle. The graphite modified particle was heat-treated at 450° C. under an air atmosphere and furnace-cooled, obtaining a graphite modified composite particle having an average particle diameter (D50) of 13 μm.

Example 4

A solution including 0.08 parts by weight of a petroleum-based pitch (yield after carbonization: 0.05 wt %) based on 100 parts by weight of tetrahydrofuran was prepared. 1 part by weight of a spherically-shaped natural graphite particles having an average particle diameter (D50) of 11 μm (SGB10L, Carbonix Inc.) was added to the solution, the mixture was agitated and simultaneously ultrasonic wave-treated with a frequency of 20 kHz and strength of 375 W for 5 minutes, and then naturally dried at 80° C., manufacturing graphite modified particles. The graphite modified particles were heat-treated at 1200° C. for 1 hour under an argon atmosphere and then furnace-cooled, obtaining graphite modified composite particles having an average particle diameter (D50) of 12.8 μm.

Example 5

A solution including 0.16 parts by weight of a petroleum-based pitch (yield after carbonization: 0.1 wt %) based on 100 parts by weight of tetrahydrofuran was prepared. 1 part by weight of spherically-shaped natural graphite particles having an average particle diameter (D50) of 11 μm (SGB10L, Carbonix Inc.) was added to the solution, the mixture was agitated and simultaneously ultrasonic wave-treated with a frequency of 20 kHz and strength of 375 W for 5 minutes, and then naturally dried at 80° C., obtaining graphite modified particles. The graphite modified particles were heat-treated at 1200° C. for 1 hour under an argon atmosphere and furnace-cooled, obtaining graphite modified composite particles having an average particle diameter (D50) of 13.4 μm.

Example 6

A solution was prepared by dissolving 0.5 parts by weight of polyacrylic acid in 100 parts by weight of distilled water. 1 part by weight of spherically-shaped natural graphite particles having an average particle diameter (D50) of 11 μm (SGB10L, Carbonix Inc.) was added to the solution, the mixture was agitated and simultaneously ultrasonic wave-treated with a frequency of 20 kHz and strength of 375 W for 5 minutes, and spray-dried while being rotated at 160° C., obtaining graphite modified particles. The graphite modified particles were heat-treated at 900° C. for 1 hour under an argon (Ar) atmosphere and furnace-cooled, obtaining graphite modified composite particles having an average particle diameter (D50) of 13 μm.

Example 7

A solution including 0.5 parts by weight of polyacrylic acid and 0.1 parts by weight of lithium acetate based on 100 parts by weight of distilled water was prepared. 1 parts by weight of spherically-shaped natural graphite particles having an average particle diameter (D50) of 11 μm (SGB10L, Carbonix Inc.) was added to the solution, the mixture was agitated and simultaneously ultrasonic wave-treated with a frequency of 20 kHz and strength of 375 W for 5 minutes, and then spray-dried while being rotated at 160° C., obtaining graphite modified particles. The graphite modified particles were heat-treated at 900° C. for 1 hour under an argon (Ar) atmosphere and furnace-cooled, obtaining graphite modified composite particles having an average particle diameter (D50) of 16 μm.

Comparative Example 1

Spherically-shaped natural graphite particles having an average particle diameter (D50) of 11 μm (SGB10L, Carbonix Inc.) were used as a negative active material.

Comparative Example 2

A solution including 0.08 parts by weight of a petroleum-based pitch (yield after carbonization: 0.05 wt %) based on 100 parts by weight of tetrahydrofuran was prepared. 1 part by weight of spherically-shaped natural graphite particles having an average particle diameter (D50) of 11 μm (SGB10L, Carbonix Inc.) was added to the solution, the mixture was agitated, naturally dried at 80° C., and then heat-treated at 1200° C. for 1 hour under an argon atmosphere and furnace-cooled for carbonation, obtaining spherically-shaped natural graphite particles.

Evaluation 1: Analysis of Scanning Electron Microscope (SEM) Photograph of Negative Active Material Scanning electron microscope (SEM) photographs of the negative active materials according to Examples 1 to 7 and Comparative Examples 1 and 2 are provided in FIGS. 1 to 9, respectively.

Figure 7A:
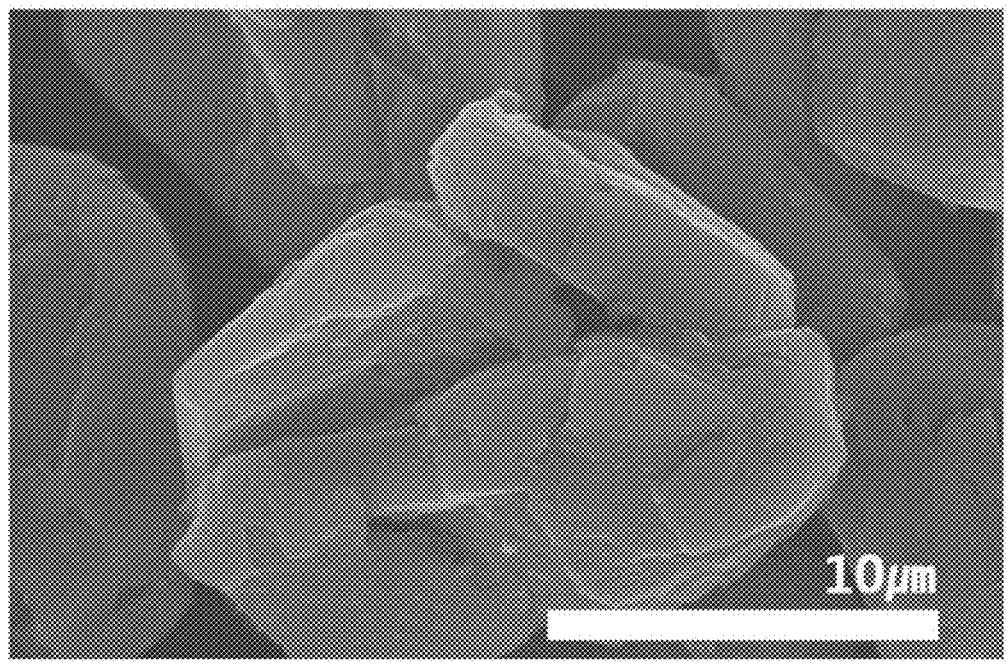
FIGS. 7A and 7B are 5000× magnification and 20,000× magnification scanning electron microscope (SEM) photographs of the negative active materials according to Example 7, respectively.
Figure 7B:
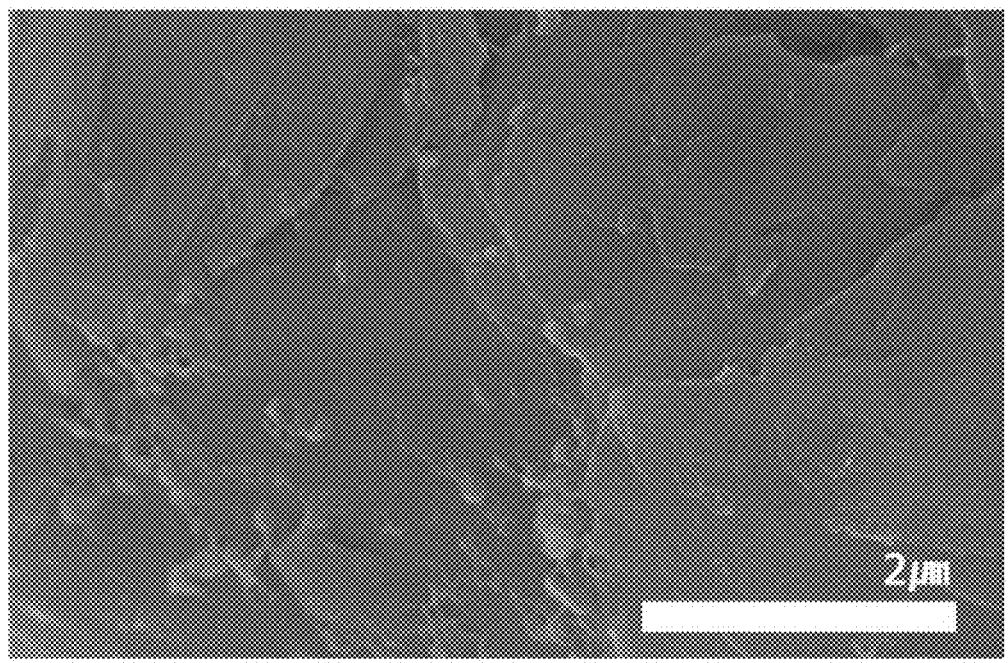
Figure 8:
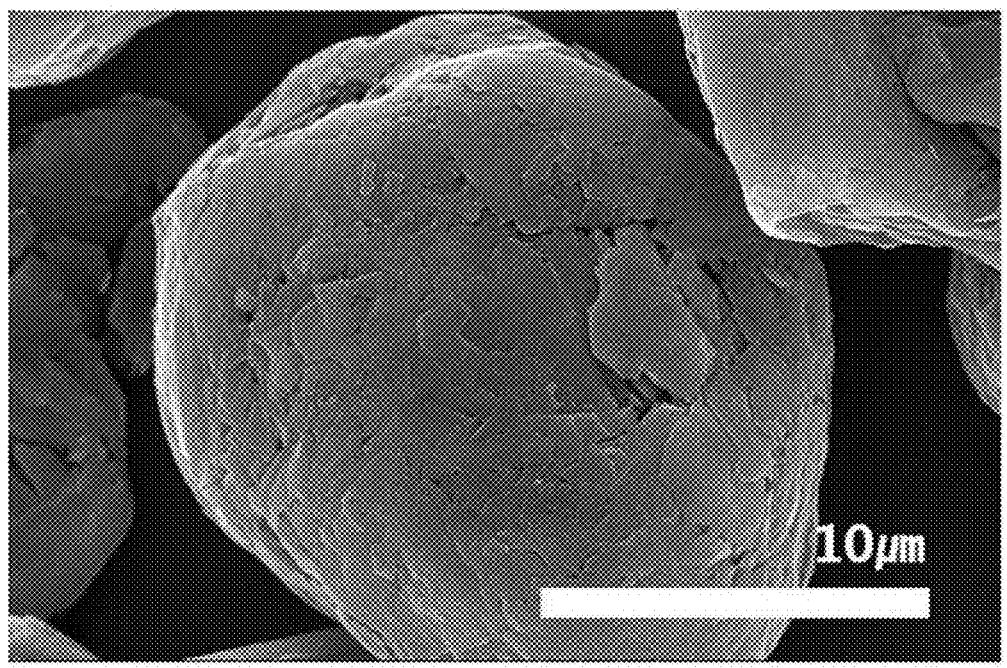
FIGS. 8 and 9 are scanning electron microscope (SEM) photographs of the negative active materials according to Comparative Examples 1 and 2, respectively.
Figure 9:
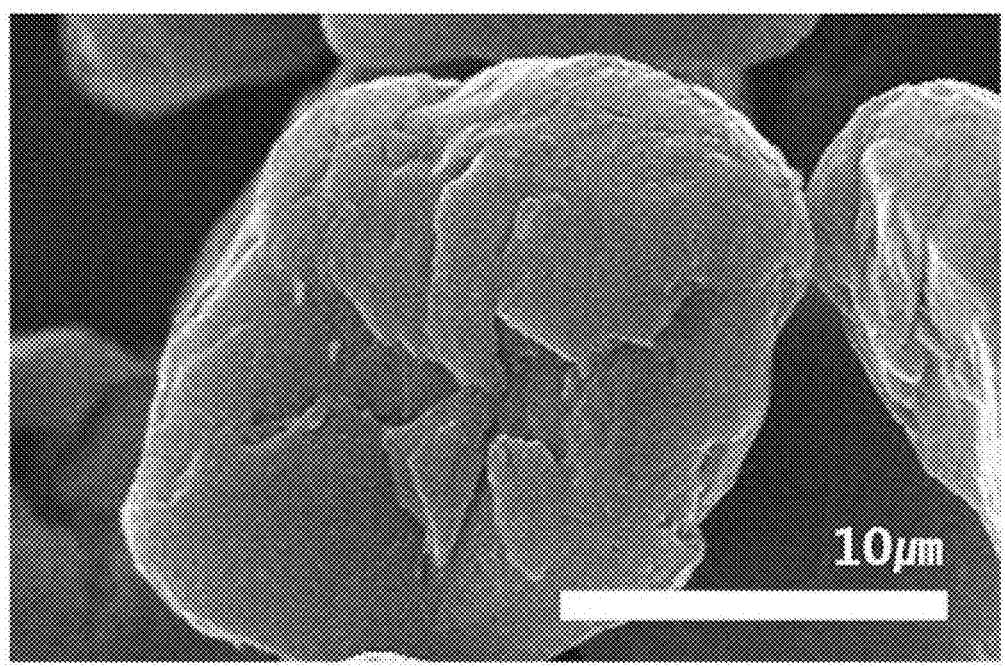

FIGS. 1 to 6 are scanning electron microscope (SEM) photographs of the negative active materials according to Examples 1 to 6, respectively, and FIGS. 7A and 7B are 5000 magnification and 20,000 magnification scanning electron microscope (SEM) photographs of the negative active material according to Example 7. FIGS. 8 and 9 are scanning electron microscope (SEM) photographs of the negative active materials according to Comparative Examples 1 and 2, respectively.

Referring to FIGS. 1 to 7B, the negative active materials according to Examples 1 to 3 showed that micropores were formed on the surface of the spherically-shaped natural graphite particles. The negative active materials according to Examples 4 to 7 showed that micropores on the surface of the spherically-shaped natural graphite particles became smaller or were partly extinct, since the external and internal surfaces of the spherically-shaped natural graphite particle were coated with carbon, and the negative active material ultrasonic wave-treated in a solution including a carbon precursor and lithium acetate and then heat-treated according to Example 7 showed that lithium carbonate particles were present on the surface of the spherically-shaped natural graphite particles.

In addition, the negative active material according to Comparative Example 1 showed that the surface of spherically-shaped natural graphite particles were not treated with ultrasonic waves, while the negative active material according to Comparative Example 2 showed that the surface of a spherically-shaped natural graphite particles was not treated with ultrasonic waves but was coated with carbon particles.

Evaluation 2: Analysis of Particle Distribution of Negative Active Material

The particle distribution of the negative active materials according to Examples 1 to 7 and Comparative Examples 1 and 2 were measured by using a laser diffraction-scattering particle distribution measurement method, and their average particle diameters (D50) were calculated and are provided in the following Table 1.

TABLE 1

| | Examples | | | | | | | Comparative Examples | |
|---|---|---|---|---|---|---|---|---|---|
| | 1 | 2 | 3 | 4 | 5 | 6 | 7 | 1 | 2 |
| Average particle diameter (D50, μm) of negative active material | 11.4 | 11.5 | 13 | 12.8 | 13.4 | 13 | 16 | 11 | 12.5 |

Referring to Table 1, the negative active materials treated with ultrasonic waves according to Examples 1 and 2 and the negative active material treated with ultrasonic waves in a solution including a lithium compound according to Example 3 showed an increased average particle diameter (D50) compared with the negative active material not treated with ultrasonic waves according to Comparative Example 1. In addition, the negative active materials treated with ultrasonic waves in a solution including a carbon precursor according to Examples 4 to 6 and the negative active material treated with ultrasonic waves in a solution including a lithium compound as well as a carbon precursor according to Example 7 showed an increased average particle diameter (D50) compared with the negative active material not treated with ultrasonic waves according to Comparative Example 2. The reason is that the ultrasonic wave treatment made a space among spherically-shaped natural graphite particles and thus formed micropores on the surface and inside of the spherically-shaped natural graphite particles.

Evaluation 3: Analysis of Specific Surface Area of Negative Active Material

The specific surface area (BET surface area) of the negative active materials according to Examples 1 to 7 and Comparative Examples 1 and 2 was measured in a gas adsorption/desorption method, and the results are provided in the following Table 2.

TABLE 2

| | Examples | | | | | | | Comparative Examples | |
|---|---|---|---|---|---|---|---|---|---|
| | 1 | 2 | 3 | 4 | 5 | 6 | 7 | 1 | 2 |
| Specific surface area (m²/g) of negative active material | 6.7 | 6.8 | 7 | 9.2 | 9.6 | 10 | 11 | 6.6 | 1.6 |

Referring to Table 2, the negative active materials treated with ultrasonic waves according to Examples 1 and 2 had an increased specific surface area compared with the negative active material not treated with ultrasonic waves according to Comparative Example 1. In addition, the negative active material treated with ultrasonic waves in a solution including a lithium compound according to Example 3 showed an increased specific surface area compared with the negative active material according to Comparative Example 1. Furthermore, the negative active materials treated with ultrasonic waves in a solution including a carbon precursor according to Examples 4 to 6 and the negative active material treated with ultrasonic waves in a solution including a lithium compound as well as a carbon precursor according to Example 7 had a much increased specific surface area compared with the negative active material not treated with ultrasonic waves according to Comparative Example 2. The reason is that the ultrasonic wave treatment made spaces among spherically-shaped natural graphite particles and formed micropores on the surface and inside the spherically-shaped natural graphite particles.

Evaluation 4: Analysis of X-Ray Diffraction Pattern of Negative Active Material

Figure 10:
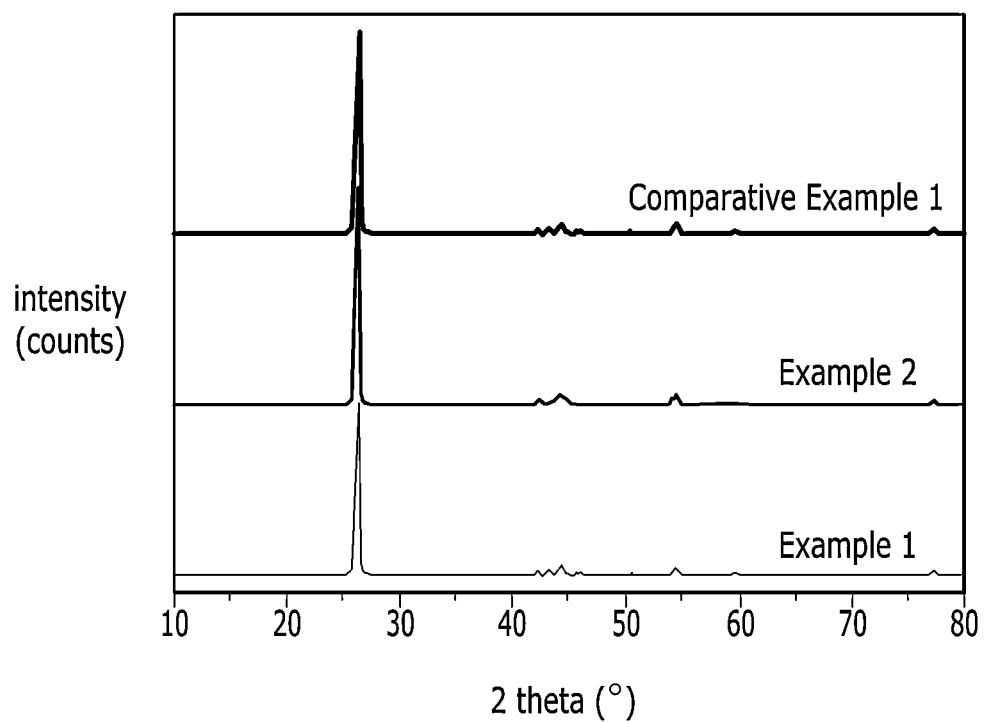
FIG. 10 shows X-ray diffraction patterns (XRD) of the negative active materials according to Examples 1 and 2 and Comparative Example 1.
Figure 11:
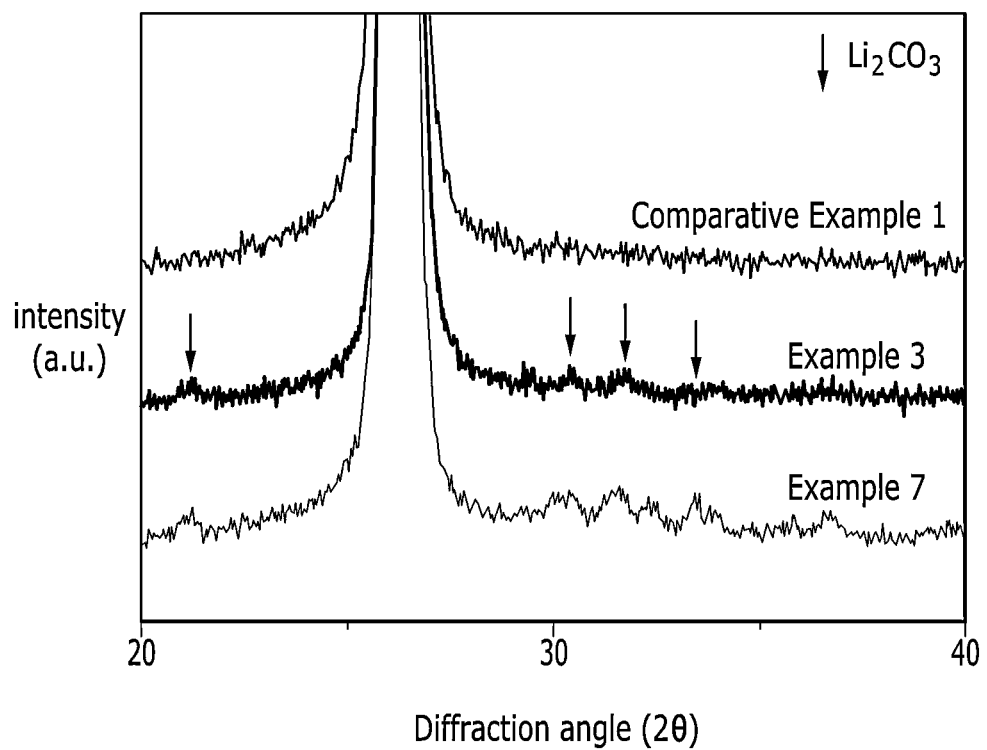
FIG. 11 shows X-ray diffraction patterns (XRD) of the negative active materials according to Examples 3 and 7 and Comparative Example 1.
Figure 12:
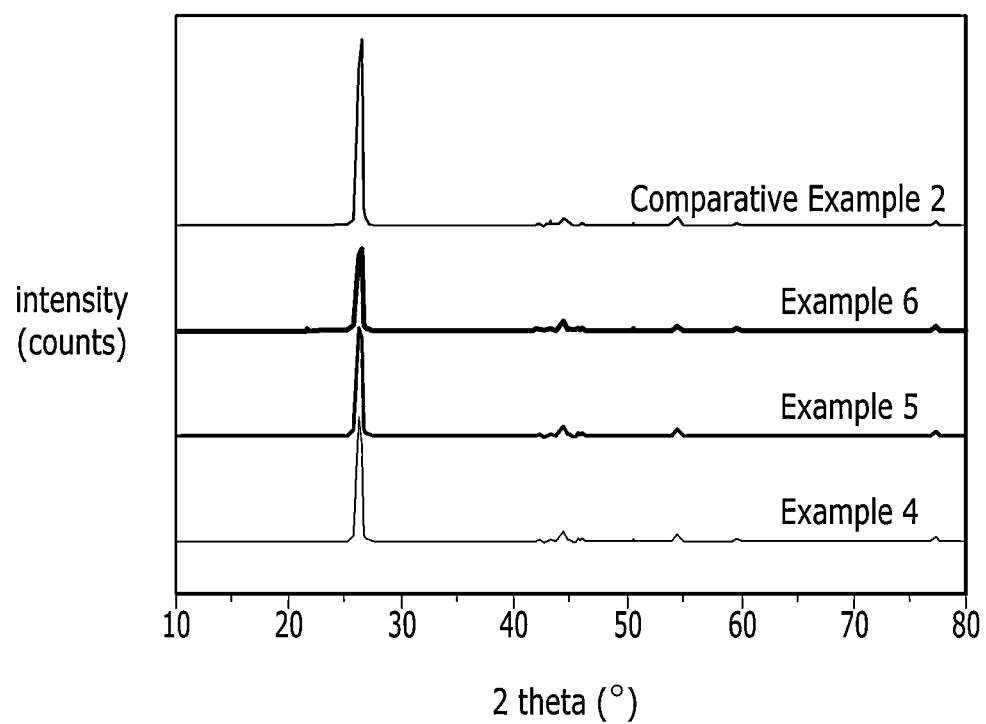
FIG. 12 shows X-ray diffraction patterns (XRD) of the negative active materials according to Examples 4 to 6 and Comparative Example 2.

The negative active materials according to Examples 1 to 7 and Comparative Examples 1 and 2 were measured regarding crystallinity by using an X-ray diffraction pattern analyzer, and the results are provided in FIGS. 10 to 12.

FIG. 10 shows X-ray diffraction patterns (XRD) of the negative active materials according to Examples 1 and 2 and Comparative Example 1, FIG. 11 shows X-ray diffraction patterns (XRD) of the negative active materials according to Examples 3 and 7 and Comparative Example 1, and FIG. 12 shows X-ray diffraction patterns (XRD) of the negative active materials according to Examples 4 to 6 and Comparative Example 2.

Referring to FIGS. 10 and 12, spherically-shaped natural graphite particles were treated with ultrasonic waves but maintained crystallinity. In addition, referring to FIG. 11, spherically-shaped natural graphite particles treated with ultrasonic waves in a solution including a lithium compound and then heat-treated according to Examples 3 and 7 showed that lithium carbonate was formed.

(Manufacture of Test Cells)

Each negative active material according to Examples 1 to 7 and Comparative Examples 1 and 2 was mixed with CMC/SBR (carboxylmethyl cellulose/styrene-butadiene rubber) in a weight ratio of 95:5 in distilled water, preparing a negative electrode slurry. The negative electrode slurry was coated on a copper foil and then dried and compressed, manufacturing each negative electrode.

Each negative electrode, a lithium metal as a positive electrode, and a separator formed of a porous polypropylene film and interposed between the negative and positive electrodes were used to manufacture an electrode assembly. Then, an electrolyte solution prepared by mixing diethyl carbonate (DEC) and ethylene carbonate (EC) (DEC:EC=1:1) and dissolving 1M $LiPF_6$ in the mixed solvent was used with the electrode assembly, manufacturing a cell for a test.

Evaluation 5: Analysis of Scanning Electron Microscope (SEM) Photograph of Negative Electrode Scanning electron microscope (SEM) photographs of the surface of each negative electrode according to Examples 1, 4, 6, and 7 and Comparative Examples 1 and 2 are provided in FIGS. 13 to 18, respectively.

Figure 17:
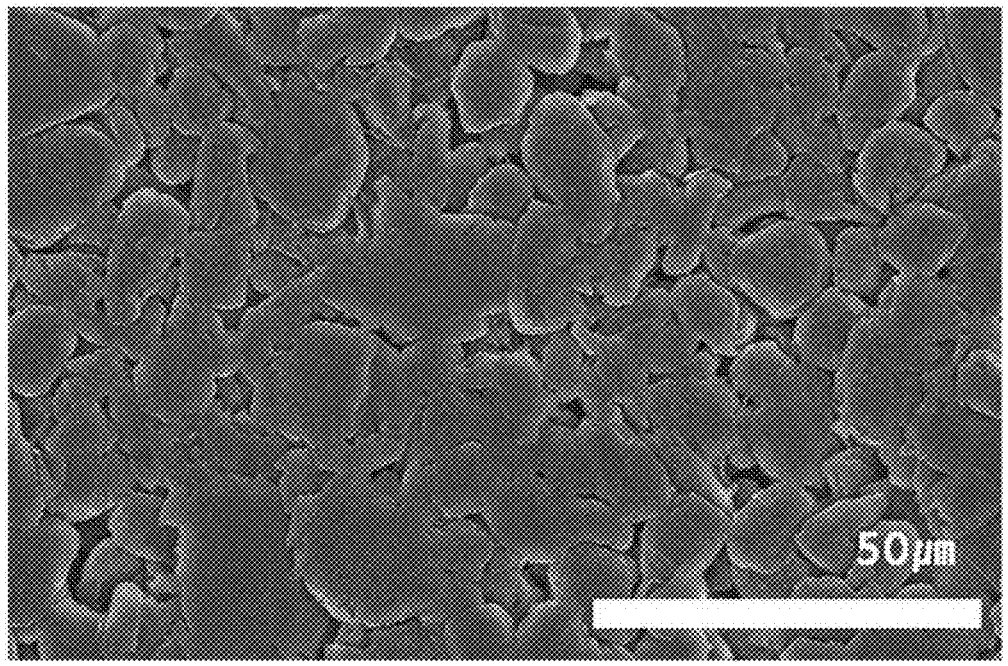
FIGS. 17 and 18 are scanning electron microscope (SEM) photographs of surfaces of negative electrodes according to Comparative Examples 1 and 2, respectively.
Figure 18:
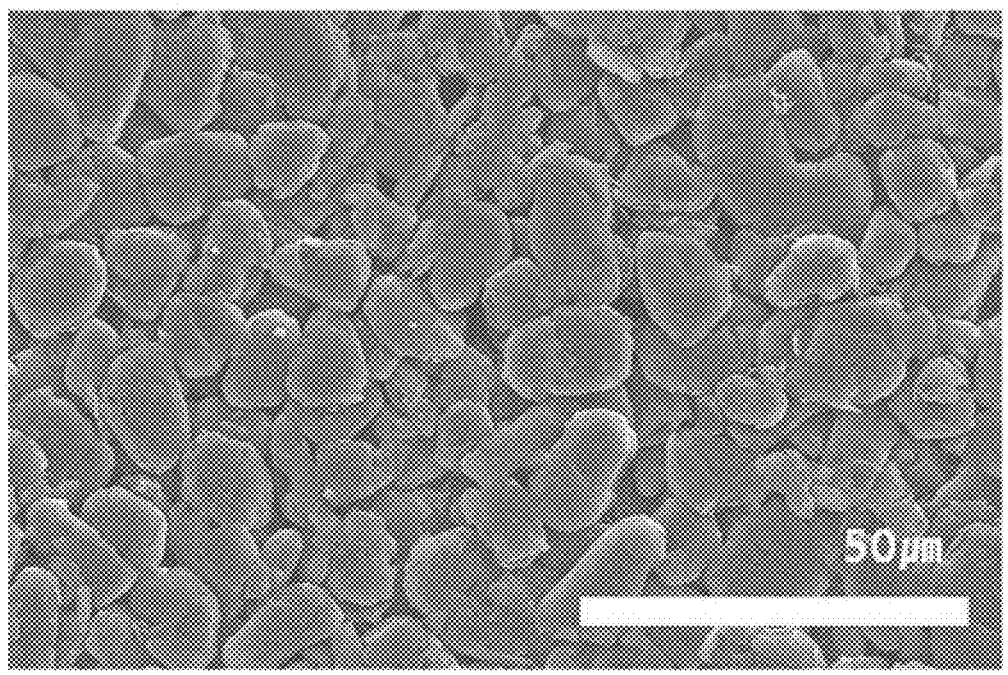

FIGS. 13 to 16 are scanning electron microscope (SEM) photographs of surfaces of negative electrodes according to Examples 1, 4, 6, and 7, and FIGS. 17 and 18 are scanning electron microscope (SEM) photographs of surfaces of negative electrodes according to Comparative Examples 1 and 2.

Figure 13:
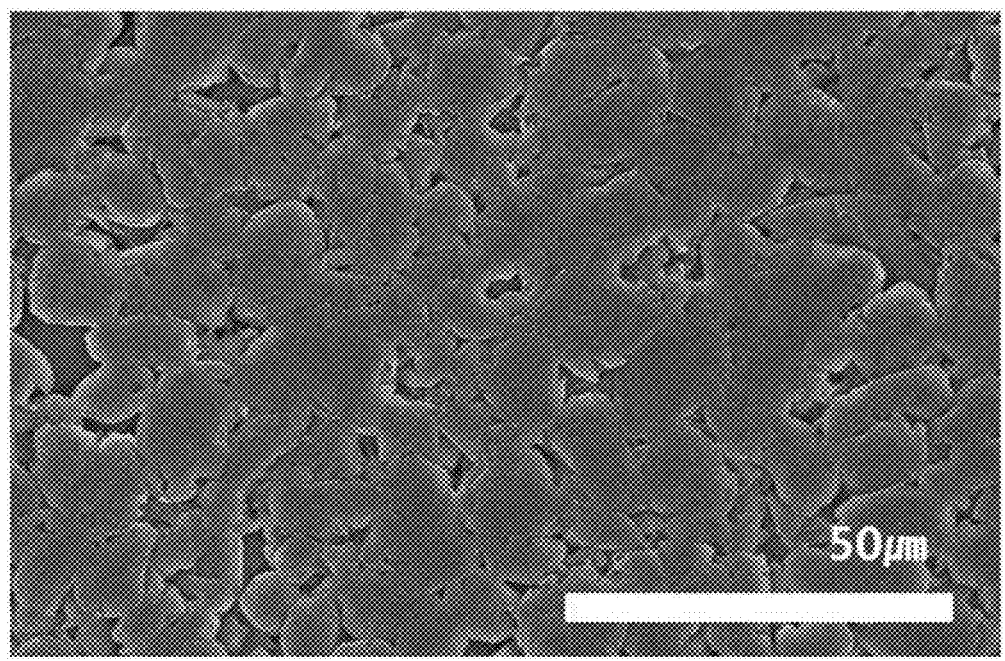
FIGS. 13 to 16 are scanning electron microscope (SEM) photographs of surfaces of negative electrodes according to Examples 1, 4, 6, and 7, respectively.
Figure 14:
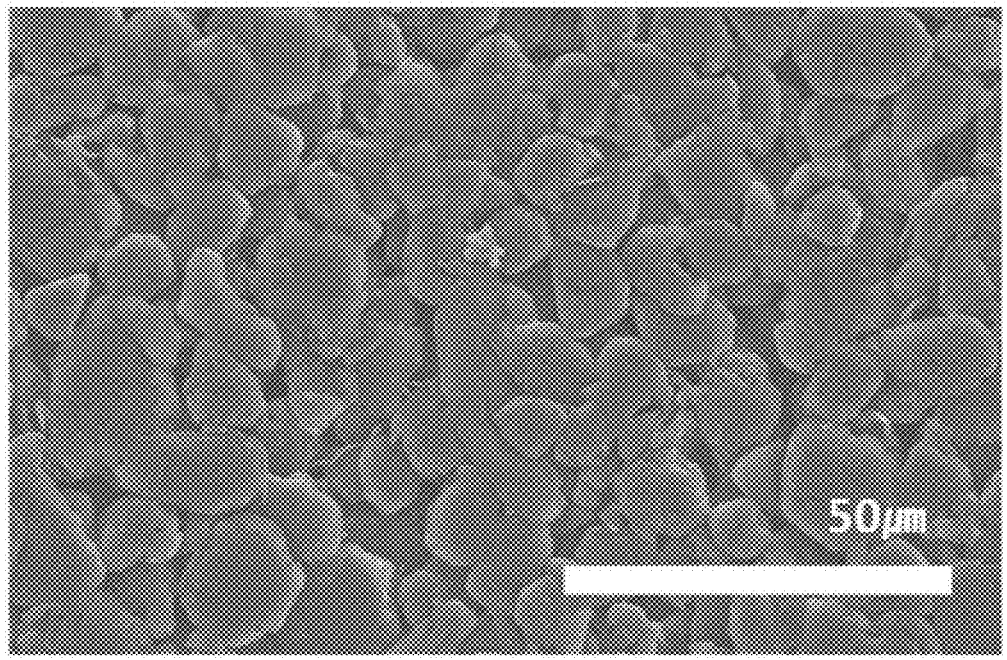
Figure 15:
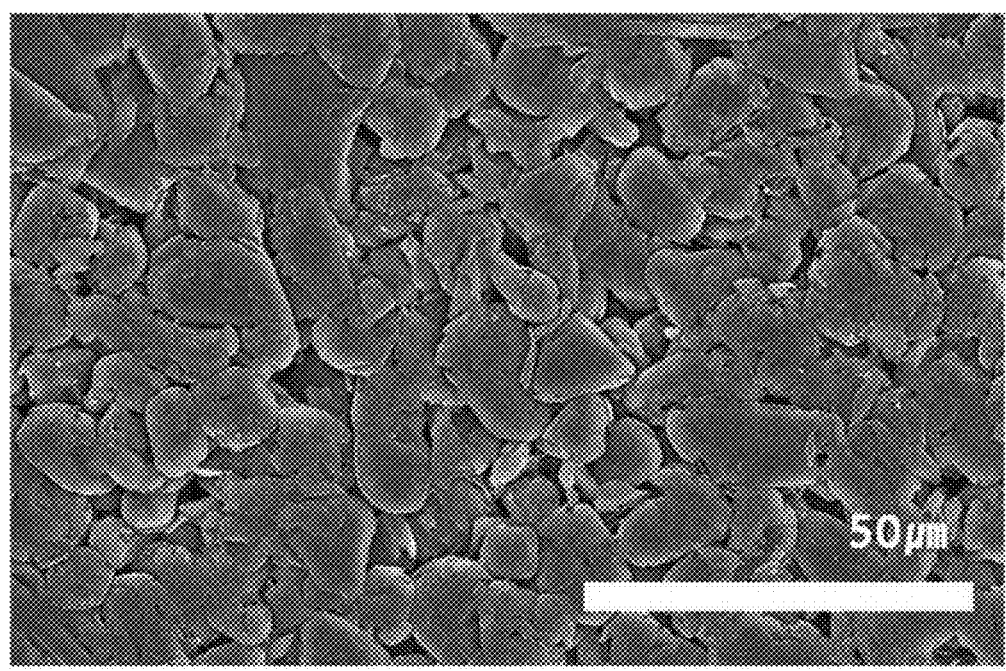
Figure 16:
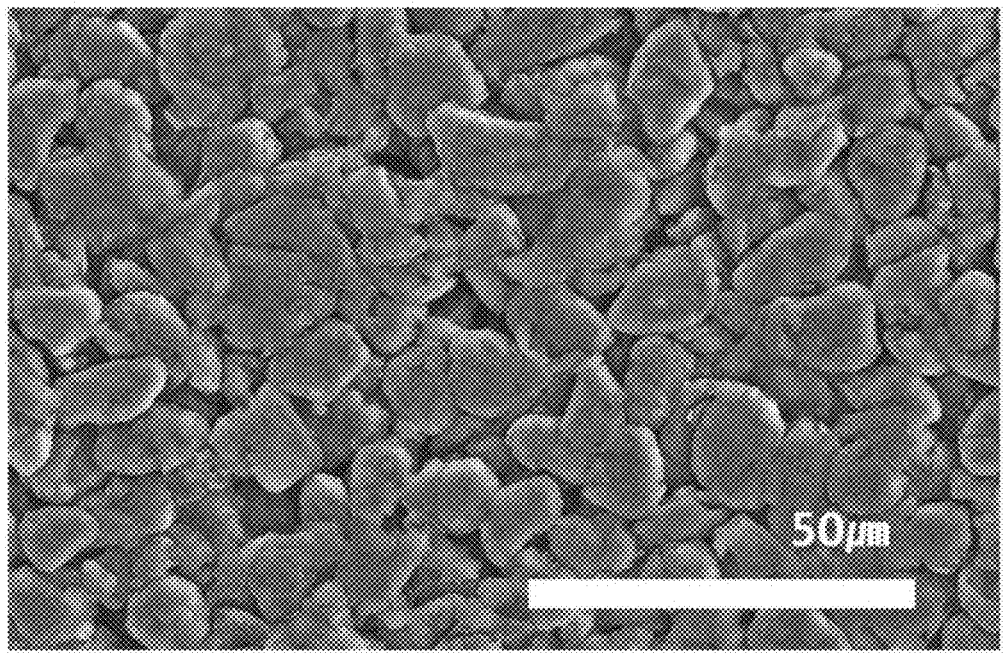

When a spherically-shaped natural graphite active material not coated with carbon was used to manufacture an electrode, spherically-shaped natural graphite particles were crushed during a compression process. Referring to FIGS. 13 and 17, the spherically-shaped natural graphite active materials according to Example 1 and Comparative Example 1 were crushed by a similar degree during a compression process for manufacturing a negative electrode. Referring to FIGS. 14 to 16 and 18, the negative active materials treated with ultrasonic waves in a solution including a carbon precursor according to Examples 4, 6, and 7 were similarly particle-crushed due to a compression process for manufacturing a negative electrode compared with the negative active material according to Comparative Example 2, and the negative active materials according to Examples 4, 6, and 7 and Comparative Example 2 showed a crush improvement compared with the negative active materials according to Example 1 and Comparative Example 1.

Evaluation 6: Analysis of Initial Charge and Discharge Characteristics of Rechargeable Lithium Battery Cells Initial charge and discharge characteristics of the test cells according to Examples 1 to 7 and Comparative Examples 1 and 2 were evaluated by the following method, and the results are provided in the following Table 3.

The cells according to Examples 1 to 7 and Comparative Examples 1 and 2 were charged with a current density of 70 mA/g (0.2 C rate) in a CC/CV mode and maintained a cut-off voltage of 0.005 V, and the charge was ended at a current of 7 mA/g (10% of current density). The cells were discharged with a current density of 70 mA/g in a CC mode and maintained a cut-off voltage of 2 V.

The initial efficiency (%) in the following Table 3 was calculated as a percentage of initial discharge capacity relative to initial charge capacity.

TABLE 3

|  | Initial efficiency (%) |
| --- | --- |
| Example 1 | 90 |
| Example 2 | 90 |
| Example 3 | 92.5 |
| Example 4 | 91.5 |
| Example 5 | 91.2 |
| Example 6 | 90 |
| Example 7 | 91 |
| Comparative Example 1 | 90 |
| Comparative Example 2 | 91.5 |

Referring to Table 3, the negative active material treated with ultrasonic waves according to Example 1 showed the same initial efficiency as that of the negative active material not treated with ultrasonic waves according to Comparative Example 1, while the negative active material treated with ultrasonic waves in a solution including a lithium compound according to Example 3 showed sharply increased initial efficiency compared with that of the negative active material not treated with ultrasonic waves according to Comparative Example 1. In addition, the negative active materials treated with ultrasonic waves in a solution including a carbon precursor according to Examples 4 to 6 and the negative active material treated with ultrasonic waves in a solution including a lithium compound as well as a carbon precursor according to Example 7 show similar initial efficiency to that of the negative active material not treated with ultrasonic waves according to Comparative Example 2.

Evaluation 7: Analysis of High-Rate Charge Characteristics of Rechargeable Lithium Battery Cell The test cells according to Examples 1 to 7 and Comparative Examples 1 and 2 were evaluated regarding high-rate charge characteristics, and the results are provided in the following Table 4.

The cells according to Examples 1 to 7 and Comparative Examples 1 and 2 were charged with a current density ranging from 70 to 700 mA/g in a CC mode and maintained at a cut-off voltage of 0.005 V, and then discharged with a current density of 70 mA/g in a CC mode and maintained at a cut-off voltage of 2 V.

TABLE 4

| | Charge capacity (mAh/g) | | |
|---|---|---|---|
| | 70 mA/g | 350 mA/g | 700 mA/g |
| Example 1 | 337 | 225 | 103 |
| Example 2 | 321 | 205 | 75 |
| Example 3 | 327 | 210 | 72 |
| Example 4 | 339 | 252 | 122 |
| Example 5 | 334 | 209 | 82 |
| Example 6 | 335 | 230 | 108 |
| Example 7 | 331 | 231 | 100 |
| Comparative Example 1 | 308 | 150 | 50 |
| Comparative Example 2 | 322 | 200 | 70 |

Referring to Table 4, the negative active material treated with ultrasonic waves according to Examples 1 to 7 showed excellent high-rate charge characteristics compared with the negative active materials not treated with ultrasonic waves according to Comparative Examples 1 and 2.

Evaluation 8: Analysis of High-Rate Discharge Characteristics of Rechargeable Lithium Battery Cell The test cells according to Examples 1 to 7 and Comparative Examples 1 and 2 were evaluated regarding high rate discharge characteristics in the following method, and the results are provided in the following Table 5.

The cells according to Examples 1 to 7 and Comparative Examples 1 and 2 were charged with a current density of 70 mA/g in a CC/CV mode and maintained at a cut-off voltage of 0.005 V, and then the charge was cut-off at a current of 7 mA/g (10% of current density). The cells were discharged in a range of 70 to 3500 mA/g in a CC mode and maintained at a cut-off voltage of 2 V.

TABLE 5

| | Discharge capacity (mAh/g) | | | | |
|---|---|---|---|---|---|
| | 70 mA/g | 350 mA/g | 700 mA/g | 1750 mA/g | 3500 mA/g |
| Example 1 | 358 | 357 | 356 | 349 | 286 |
| Example 2 | 359 | 358 | 357 | 348 | 284 |
| Example 3 | 354 | 353 | 350 | 323 | 282 |
| Example 4 | 355 | 355 | 354 | 352 | 348 |
| Example 5 | 354 | 351 | 348 | 346 | 337 |
| Example 6 | 355 | 354 | 353 | 343 | 330 |
| Example 7 | 349 | 349 | 347 | 333 | 330 |
| Comparative Example 1 | 358 | 347 | 331 | 280 | 196 |
| Comparative Example 2 | 346 | 332 | 320 | 305 | 280 |

Referring to Table 5, the negative active materials treated with ultrasonic waves according to Examples 1 to 7 showed excellent high rate discharge characteristic compared with the negative active materials not treated with ultrasonic waves according to Comparative Examples 1 and 2.

Evaluation 9: Analysis of Cycle-Life Characteristics of Rechargeable Lithium Battery Cell The test cells according to Examples 1, 3, 4, and 7 and Comparative Example 1 were evaluated regarding cycle-life, and the results are provided in FIG. 19.

The test cells were charged with a current density of 70 mA/g (0.2 C) in a CC mode and maintained at a cut-off voltage of 0.005 V. The cells were discharged with a current density of 70 mA/g (0.2 C) in a CC mode and maintained at a cut-off voltage of 2 V, and the charge and discharge were repeated 50 cycles in total.

Figure 19:
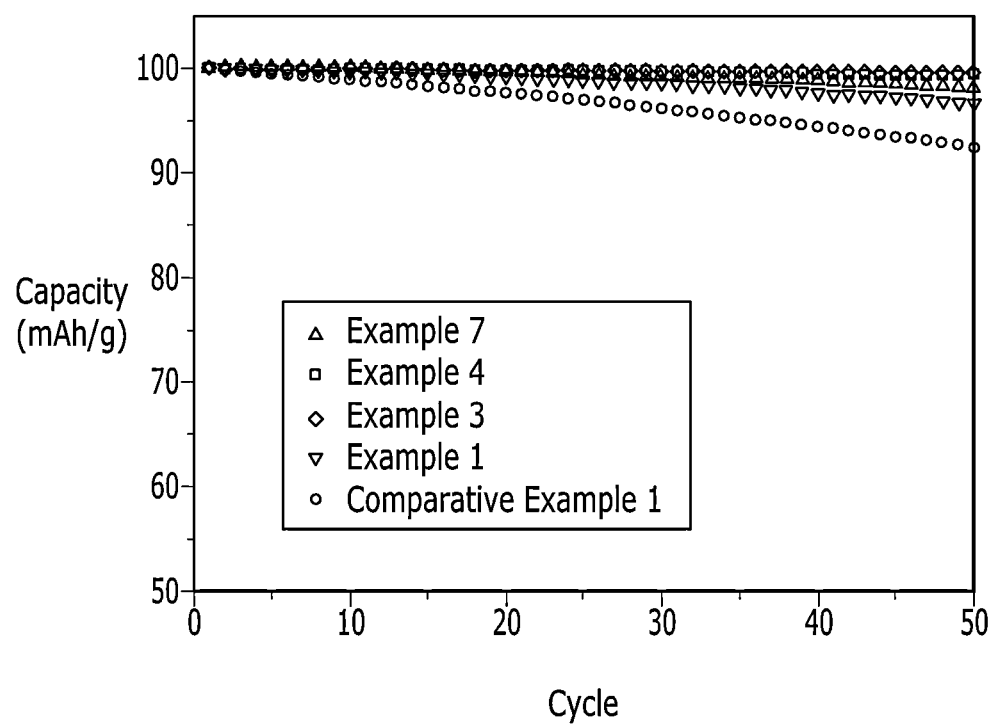
FIG. 19 is a graph showing cycle-life characteristics of the negative electrode manufactured according to Examples 1, 3, 4, and 7 and Comparative Example 1.

FIG. 19 is a graph showing cycle-life characteristics of the negative electrode manufactured according to Examples 1, 3, 4, and 7 and Comparative Example 1.

Referring to FIG. 19, spherically-shaped natural graphite particles treated with ultrasonic waves according to Examples 1, 3, 4, and 7 showed excellent cycle-life characteristic compared with spherically-shaped natural graphite particles not treated with ultrasonic waves according to Comparative Example 1.

Accordingly, a negative active material may be prepared by forming micropores on the surface of and inside spherically-shaped graphite particles using ultrasonic wave, and thus have improved reactivity with an electrolyte solution and realize a rechargeable lithium battery having excellent high-rate charge and discharge and cycle-life characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A method of preparing a negative active material for a rechargeable lithium battery, comprising:
    preparing a solution including spherically shaped natural graphite particles and a solvent;
    ultrasonic wave-treating the solution;
    drying the ultrasonic wave-treated solution to prepare graphite modified particles; and
    heat-treating the graphite modified particles to prepare graphite modified composite particles after preparing the graphite modified particles,
    wherein the spherically shaped natural graphite particles are prepared by assembling flake-shaped natural graphite particles into a spherical shape, and
    wherein ultrasonic waves are radiated at an intensity of about 100 to about 1000 W for about 1 to about 10 minutes.

2. The method of claim 1, wherein the spherically shaped natural graphite particles have an average particle diameter (D50) of about 3 to about 40 μm.

3. The method of claim 1, wherein the solvent comprises at least one selected from water, N-methylpyrrolidone, dimethylformamide, toluene, ethylene, dimethylacetamide, acetone, methylethylketone, hexane, tetrahydrofuran, decane, ethanol, methanol, isopropanol, and ethyl acetate.

4. The method of claim 1, wherein the spherically shaped natural graphite particles are included in an amount of about 0.1 to about 200 parts by weight based on 100 parts by weight of the solvent.

5. The method of claim 1, wherein the ultrasonic waves have a frequency of about 10 to about 40 kHz.

6. The method of claim 1, wherein the drying is performed using at least one spray dry method selected from rotary spray, nozzle spray, and ultrasonic wave spray methods; a drying method using a rotary evaporator; a vacuum-dry method; or a natural drying method.

7. The method of claim 1, wherein the solution further comprises a carbon precursor, and the carbon precursor comprises at least one selected from citric acid, stearic acid, sucrose, polyvinylidene fluoride, carboxylmethyl cellulose (CMC), hydroxypropyl cellulose, regenerated cellulose, polyvinylpyrrolidone, tetrafluoroethylene, polyethylene, polypropylene, an ethylene-propylene-diene monomer (EPDM), sulfonated EPDM, starch, a phenolic resin, a furan resin, furfuryl alcohol, polyacrylic acid, sodium polyacrylate, polyacrylonitrile, polyimide, an epoxy resin, cellulose, styrene, polyvinyl alcohol, polyvinylchloride, coal-based pitch, petroleum-based pitch, mesophase pitch, low molecular weight heavy oil, glucose, gelatin, and saccharides.

8. The method of claim 1, wherein the heat-treating is performed at a temperature of about 500 to about 2500° C.

9. The method of claim 1, wherein the heat-treating is performed under an atmosphere including nitrogen, argon, hydrogen, air, oxygen, or a mixed gas thereof, or under vacuum.

10. The method of claim 1, wherein the solution further comprises a carbon precursor, and the carbon precursor is included in an amount of about 0.1 to about 80 parts by weight based on 100 parts by weight of the spherically shaped natural graphite particles.

11. The method of claim 1, wherein the solution further comprises a lithium compound, and
the method further comprises heat-treating the graphite modified particles to prepare graphite modified composite particles after preparing the graphite modified particles.

12. The method of claim 11, wherein the lithium compound comprises at least one selected from lithium hydroxide including LiOH or LiOH.(H$_2$O); lithium nitrate (LiNO$_3$); lithium acetate including CH$_3$COO.Li or CH$_3$COO.Li.2(H$_2$O); lithium carbonate (Li$_2$CO$_3$); and lithium fluoride (LiF).

13. The method of claim 11, wherein the heat-treating is performed at a temperature of about 150 to about 2500° C.

14. The method of claim 11, wherein the lithium compound is included in an amount of about 0.1 to about 50 parts by weight based on 100 parts by weight of the spherically shaped natural graphite particles.

* * * * *